US009652554B2

United States Patent
Shalita et al.

(10) Patent No.: US 9,652,554 B2
(45) Date of Patent: May 16, 2017

(54) SYSTEMS AND METHODS FOR ADDING USERS TO A NETWORKED COMPUTER SYSTEM

(71) Applicant: Facebook, Inc., Menlo Park, CA (US)

(72) Inventors: Alon Michael Shalita, Palo Alto, CA (US); Arun Sharma, Union City, CA (US)

(73) Assignee: Facebook, Inc., Menlo Park, CA (US)

( * ) Notice: Subject to any disclaimer, the term of this patent is extended or adjusted under 35 U.S.C. 154(b) by 223 days.

(21) Appl. No.: 14/141,103

(22) Filed: Dec. 26, 2013

(65) Prior Publication Data

US 2015/0186492 A1 Jul. 2, 2015

(51) Int. Cl.
*G06F 17/30* (2006.01)

(52) U.S. Cl.
CPC .. *G06F 17/30958* (2013.01); *G06F 17/30587* (2013.01)

(58) Field of Classification Search
USPC ................................................ 707/737, 747
See application file for complete search history.

(56) References Cited

U.S. PATENT DOCUMENTS

| 5,371,673 | A  | * | 12/1994 | Fan ........................ G06Q 30/02 704/1 |
| 7,043,621 | B2 | * | 5/2006  | Merchant .............. G06F 3/0608 707/999.202 |
| 7,383,258 | B2 | * | 6/2008  | Harik ................ G06F 17/30616 |
| 8,438,364 | B2 | * | 5/2013  | Venkataramani ... G06F 17/3048 711/216 |
| 8,527,497 | B2 | * | 9/2013  | Singh ................ G06F 17/30867 707/707 |
| 8,608,570 | B1 | * | 12/2013 | Mahajan ............... A63F 13/216 273/274 |
| 8,612,688 | B2 | * | 12/2013 | Venkataramani ... G06F 17/3048 711/124 |
| 2015/0120771 | A1 | * | 4/2015 | Lee ........................ H04L 67/30 707/758 |

* cited by examiner

*Primary Examiner* — Kim Nguyen
(74) *Attorney, Agent, or Firm* — Sheppard Mullin Richter & Hampton LLP

(57) ABSTRACT

Systems and methods are provided for adding new nodes to a computer networked system. The systems and methods may identify a first set of nodes in a networked computer system. The first set of nodes may be included in a first hash computation that clusters the first set of nodes into communities. An application shard space including a first space and a second space may be generated. The first set of nodes may be mapped to application shards in the first space based on the first hash computation. The application shards in the first space may be assigned to a first set of machines of the networked computer system. The second space may be maintained for mappings of nodes not included in the first hash computation to application shards in the second space.

20 Claims, 6 Drawing Sheets

SYSTEMS AND METHODS FOR ADDING USERS TO A NETWORKED COMPUTER SYSTEM

FIELD OF THE INVENTION

The present invention relates to the field of networked computer systems. More particularly, the present invention provides techniques for adding new nodes to a networked computer system.

BACKGROUND

Social networking websites provide a dynamic environment in which users or members can connect to and communicate with other users. These websites may commonly provide online mechanisms allowing members to interact within their preexisting social networks, as well as create new social networks. Users may include any individual or entity, such as an organization or business. Among other attributes, social networking websites allow users to effectively and efficiently communicate relevant information to their social networks. A user of a social network may highlight or share information, news stories, relationship activities, music, video, and any other content of interest to areas of the website dedicated to the user or otherwise made available for such content. Other users of the social network may access the shared content by browsing user profiles or performing dedicated searches. Upon access to and consideration of the content, the other users may react by taking one or more responsive actions, such as providing feedback or an opinion about the content. The ability of users to interact in this manner fosters communications among them and helps to realize the goals of social networking websites.

A social network may be modeled as a social graph. Node graphs, such as social graphs, may include an extremely large number of nodes and edges connecting the nodes. In the case of a social networking system, nodes (e.g., users) are able to access and share vast amounts of information reflected in the node graph. The number of nodes, for example, may be in the hundreds of millions or even billions.

SUMMARY

To add new nodes to a computer networked system, computer implemented methods, systems, and computer readable media, in an embodiment, may identify a first set of nodes in a networked computer system. The first set of nodes may be included in a first hash computation that clusters the first set of nodes into communities. An application shard space including a first space and a second space may be generated. The first set of nodes may be mapped to application shards in the first space based on the first hash computation. The application shards in the first space may be assigned to a first set of machines of the networked computer system. The second space may be maintained for mappings of nodes not included in the first hash computation to application shards in the second space.

In an embodiment, a node of the first set of nodes may be routed to a machine assigned to an application shard in the first space. Nodes may include users.

In an embodiment, the nodes not included in the first hash computation may include new nodes added to the networked computer system after the first hash computation.

In an embodiment, the nodes not included in the first hash computation may include existing nodes having insufficient information to be classified within a community at the time of the first hash computation.

In an embodiment, a node not included in the first hash computation may be identified. The node not included in the first hash computation may be mapped to an application shard in the second space.

In an embodiment, the node not included in the first hash computation may be routed to a machine assigned to an application shard in the second space.

In an embodiment, the first hash computation may be performed on the first set of nodes.

In an embodiment, a second set of nodes in the networked computer system may be identified. The second set of nodes may include the first set of nodes and one or more nodes not included in the first hash computation. A second hash computation may be performed on the second set of nodes. The second hash computation may cluster the second set of nodes into communities. The second set of nodes may be mapped to the application shards in the first space based on the second hash computation. The second space may be maintained for mappings of nodes not included in the second hash computation to application shards in the second space.

In an embodiment, a node of the second set of nodes may be routed to a machine assigned to an application shard in the first space.

In an embodiment, the nodes not included in the second hash computation may include new nodes added to the networked computer system after the second hash computation.

In an embodiment, the nodes not included in the second hash computation may include existing nodes having insufficient information to be classified within a community at the time of the second hash computation.

In an embodiment, a node not included in the second hash computation may be identified. The node not included in the second hash computation may be mapped to an application shard in the second space.

In an embodiment, the node not included in the second hash computation may be routed to a machine assigned to an application shard in the second space.

In an embodiment, one or more new application shards may be added to the application shard space to accommodate the second set of users.

In an embodiment, the second hash computation may be performed after a predetermined time period.

In an embodiment, the application shards in the first space and the application shards in the second space may remain a constant size.

In an embodiment, the size of the intermediate node space may be 25% or less than the size of the application shard space.

In an embodiment, the networked computer system may be a social networking system, and the nodes may be users of the social networking system.

Many other features and embodiments of the invention will be apparent from the accompanying drawings and from the following detailed description.

Figure 1:
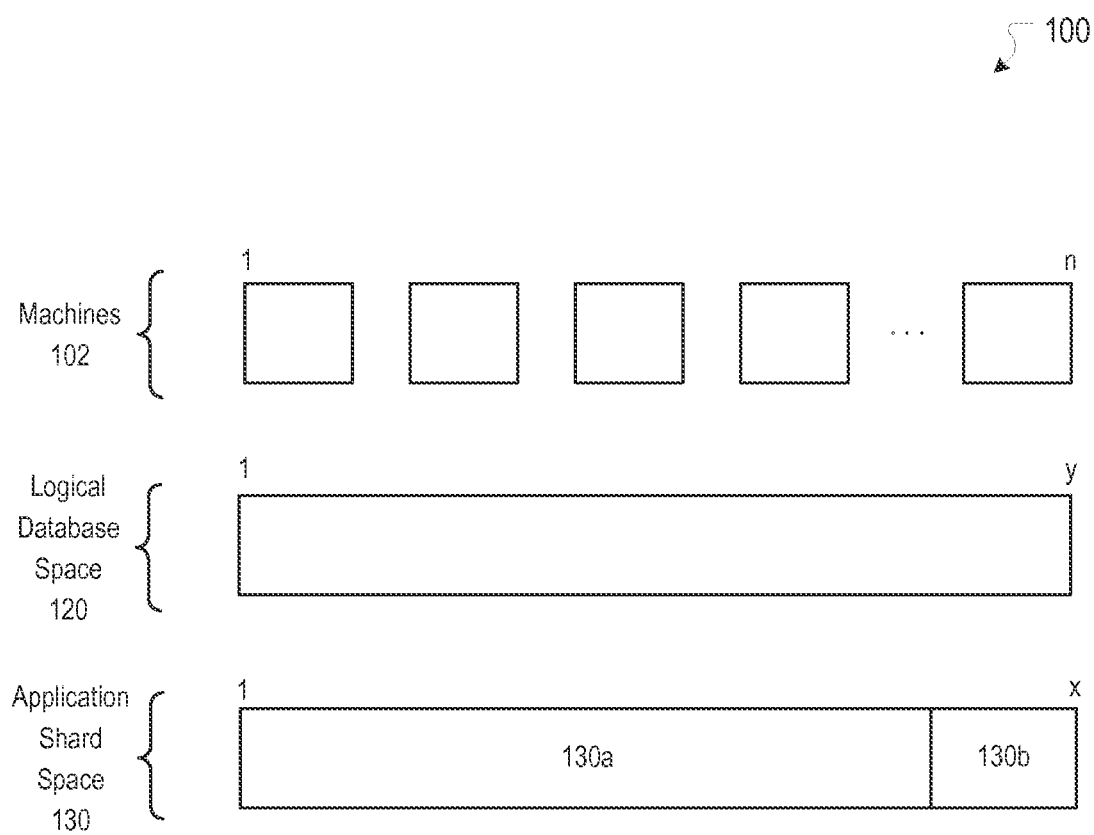
FIG. 1 illustrates an example social networking system, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Node graphs, such as social graphs, may include an extremely large number of nodes and connections (or edges) between the nodes. The number of nodes, for example, may be in the hundreds of millions or even billions. Nodes may be associated with persons or non-persons, such as businesses, organizations, content (e.g., images, video, audio, etc.), events, web pages, communications, objects, concepts, or any other thing, notion, entity or construct, whether concrete or abstract, that can be represented as a node. The term "user" is used broadly herein and may include persons or non-persons (e.g., topics, entities, etc.) functioning as nodes within a social graph. While the various aspects and embodiments of the invention are discussed herein with respect to users as a particular type of node, the various aspects and embodiments of the invention may apply equally to other types of nodes.

How a node graph is partitioned across a number of machines (e.g., computers, servers, etc.) in a networked computer system may have a great impact on the computational speed of and strain on the networked computer system. In many cases, such as with social networking systems, users are able to access and share vast amounts of information with other users. Where user information is stored (e.g., on which machine), how the user information is accessed or stored (e.g., in a persistent memory layer or a cache memory layer), and where users are routed (e.g., to which machines) may significantly impact network performance. For example, performing a query (or request) over the social networking system may potentially require a query to a large number of machines. This "fanout" of queries may not only slow down the query response time, but also may place excessive strain on the social networking system.

A hash may be computed to generate an intelligent way of organizing users of the social graph so that the users may be mapped to machines of the networked computer system in a beneficial manner. For example, a hash may be computed to cluster users of the same community together. In this way, the users may be mapped to the machines such that users of the same community tend to be mapped to the same machine.

Communities of users may be formed based on one or more commonalities between users. A commonality may be based on one or more attributes (e.g., geographic association such as city of residence), features, traits, characteristics, relationships (e.g., friendships), or any other way to group (or classify) users or communities of users. For example, the users may be clustered into communities based on friendships between users. "Higher level" communities of users may also be formed based on one or more commonalities between communities of users.

Clustering users of a community to the same machine may provide various network performance benefits, such as reducing fanout. For example, in an embodiment, the communities may be based on friendships between users. Since friends tend to be part of one or more groups of friends, there is strong tendency for friends to have many friends in common. When collecting user information for friends, and friends of friends, many queries for user information of common friends may occur. If these friends are randomly scattered over different machines, fanout may be large. However, if friends are clustered on the same machine, then the common information may be stored in a cache memory layer (or faster memory layer), thereby reducing fanout. This concept may be equally applicable to communities based on other commonalities besides friendships.

After users have been mapped to the machines, the addition of new users to the networked computer system may undermine the benefits (e.g., reduction in fanout) provided by the hash. For example, new users of a social networking system may have insufficient (or minimal) information (or context) to be effectively classified within a community. Randomly mapping the new users across the machines may detrimentally impact the clustering of communities to the machines. The detrimental impact may become more severe as more new users are randomly mapped across the machines.

The users of a social graph may be mapped to the machines of the networked computer system via application shards. For example, one or more application shards may be assigned to each machine. In certain embodiments, the size of the application shard (or the number of users that may be mapped to the application shard) may be maintained at a constant size. For instance, certain applications may require the size of the application shards to remain constant. The size of the application shard may correspond, for example, to a specific load limit on an underlying hardware device or machine. Therefore, increasing the size of the application shards may not be an available option to accommodate user growth in the social networking system.

Systems and methods of the present disclosure may provide a way to add new users to a networked computer system (e.g., social networking system) without compromising the underlying benefits of the hash computation. The systems and methods may provide a way to add new users to the networked computer system when certain limitations (or constraints) exist for the number of users that may be mapped to the application shards. While the examples shown in FIGS. 1-6 may be described with respect to users of a social networking system, it should be appreciated that the features and concepts may also be applicable more generally to nodes of any networked system.

FIG. 1 illustrates an example social networking system 100, according to an embodiment. The components shown in this figure and all figures herein are exemplary only, and other implementations may include additional, fewer, or different components. Some components may not be shown so as not to obscure relevant details.

The social networking system 100 may include n machines 102. In an embodiment, the social networking system 100 may include 80 machines. However, n may be any number of machines to support the social networking system 100. The machines 102 may be communicatively coupled to one another through one or more networks, such as a LAN, WAN, and the internet. Each of the machines 102 may include, for example, a database server having a persistent memory layer and an associated cache (or fast memory) layer (or system). Each of the machines 102 may represent a single database server or a closely associated group of database servers, such as a data center.

Information for a social graph may be stored within a persistent memory layer formed by the machines 102. For example, the machines 102 may include user information for the users in the social graph. The user information may include, for example, information related to a user profile, images, videos, posts, status updates, friends lists, feeds, or any other information associated with the user and the activities of the user on the social networking system 100 supported by the social graph. The user information for a specific user may be stored on a specific machine of the machines 102.

The machines 102 may include a cache layer to provide faster memory access than the persistent memory layer. For example, the machines 102 may implement cache layer services within RAM or other form of fast memory technology, such as Flash memory. For instance, data or computations may be cached using Alternative PHP Cache (APC), Memcache, etc. Information that has been obtained from a query by a user, for example, may be stored in the cache memory later for quicker retrieval for subsequent queries by the user or another user on the same machine.

A logical database space 120 may include y database instances for users of the social graph. y may be any number of database instances to support the social networking system 100. Each of the y database instances may correspond to a unique identifier (ID) that may be assigned to a user of the social networking system 100. The unique ID may then be mapped to an application shard in a specific machine.

In an embodiment, the logical database space 120 includes a total of 120K (or 120,000) database instances. In certain embodiments, to accommodate growth of the network (e.g., new users to the social networking system), a logical database space 120 may reserve "extra" database instances for future users that are added to (e.g., join) the social networking system. For example, the logical database space 120 may include 100K (or 100,000) database instances for assigning 100K unique IDs to existing users, as well as 20K (or 20,000) database instances for assigning 20K unique IDs to future users.

An application shard space 130 may include x application shards (or database shards) that may be assigned to the n machines 102. x may be any number of application shards to support the social networking system 100. In an embodiment, the application shard space 130 may include 10K (or 10,000) application shards that are assigned to the machines 102, which may include 80 machines. For instance, an average of 125 application shards may be assigned to each of the 80 machines 102. In an embodiment, the number of application shards may vary in each machine. In an embodiment, each machine may have the same number of application shards.

The users of the social networking system may be mapped to one of the application shards of the application shard space 130. Each application shard may have one or more users mapped to it. In an embodiment, the size of the application shards may remain constant throughout multiple hash computations. The number of application shards in the application shard space 130 may vary as needed. For example, when a new hash computation is performed and additional new users need to be accommodated, one or more new application shards may be added to accommodate the user growth, rather than increasing the size of the application shards.

A hash may be computed to generate an intelligent way of organizing existing users of the social networking system 100 so that they may be mapped to the machines 102 in a beneficial manner, such as by clustering users of a community to the same machine. The social hash may be computed to determine a hierarchical structure, to assign users to unique IDs, and to generate mappings to the application shards of the application shard space 130. In an embodiment, for example, the existing users may be sorted such that communities of users are clustered together. Unique IDs may then be sequentially assigned to the existing users such that users of a community have unique IDs that are numerically proximate to one another. The unique IDs may then be mapped in sequence to application shards from one machine to the next. In this way, each application shard and machine may have unique IDs that are proximate to one another, and users of the same community may be mapped to the same machine. In an embodiment, the users may have a previously assigned user ID that is not based on a clustering of communities. The user ID may be based on, for instance, when a user joins the social networking system. In such case, the unique IDs may be assigned to the users by mapping the users' user IDs to the unique IDs. In an embodiment, when a user performs a query, a user ID for the user may be identified and used to determine the unique ID for the user. The specific application shard, as identified by an application shard number, may be computed by dividing the unique ID by the size of the application shards. The query may then be routed to the appropriate machine based on the specific application shard that was computed for the user.

The application shard space 130 may include a space 130a and a space 130b, also referred to herein as a "hashed user space 130a" and an "intermediate user space 130b", respectively. The existing users included in the hash computation may be mapped to the hashed user space 130a. Users that are not included in the hash computation, such as new users that are added to the social networking system after the hash computation, may be mapped to the intermediate user space 130b. For example, when a new user is added to the social networking system after the hash computation, the new user may be assigned a temporary unique ID associated with one of the extra database instances reserved for future users, which may then be mapped to one of the application shards in the intermediate user space 130b. In an embodiment, some existing users may be excluded from the hash computation, such as users having insufficient information to be effectively classified within a community. These users may also be mapped to the intermediate user space 130b in a similar manner.

Figure 2:
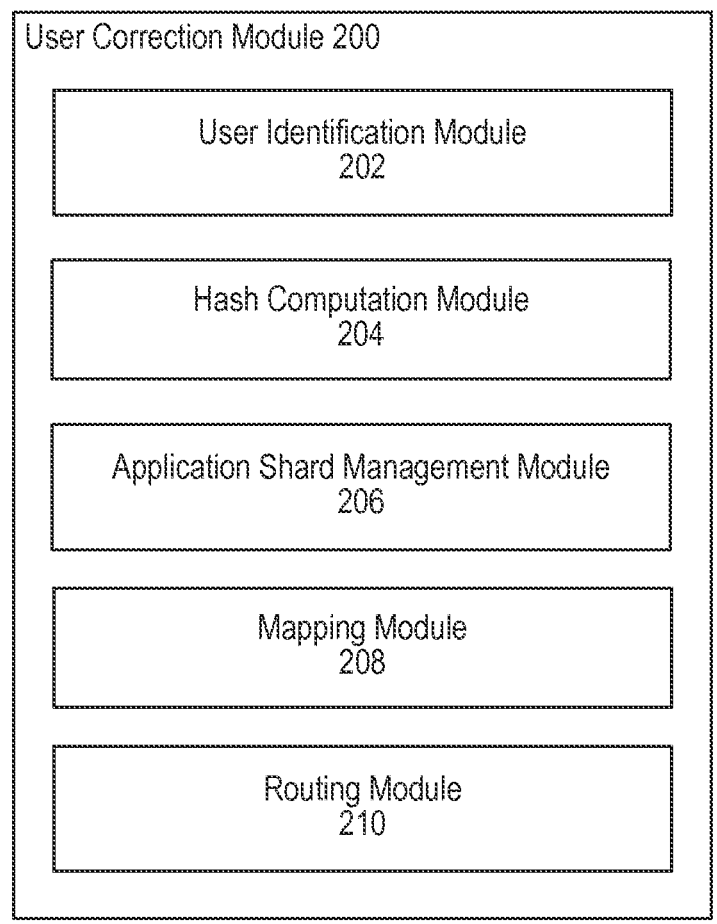
FIG. 2 illustrates an example node correction module, according to an embodiment.

FIG. 2 illustrates an example user correction module 200, according to an embodiment. The user correction module 200 may include a user identification module 202, a hash computation module 204, an application shard management module 206, a mapping module 208, and a routing module 210. It should be appreciated that the discussion above for FIG. 1 may also apply to FIG. 2. For the sake of brevity and clarity, every feature and function applicable to FIG. 2 is not repeated here.

The user identification module 202 may identify the existing users of the social networking system 100 that are to be included in a hash computation. The user identification module 202 may also identify the existing users of the social networking system 100 that were included in the last hash computation. The user identification module 202 may also identify users that were not included in the last hash computation. For example, user identification module 202 may identify new users that are added to the social networking system after a hash computation has already been performed. In an embodiment, the user identification module 202 may identify existing users having insufficient information to be effectively classified within a community.

The hash computation module 204 may perform the hash computation on the existing users of the social networking system 100. In an embodiment, the hash computation may be performed on all existing users of the social networking system 100. In an embodiment, some existing users may be excluded from the hash computation, such as users having insufficient information to be effectively classified within a community. These users may be identified by the user identification module 202 and left out of the hash computation module by the hash computation module 204.

The application shard management module 206 may manage the application shard space 130. The application shard management module 206 may assign the application shards of the application shard space 130 to the machines 102. The application shard management module 206 may determine the parameters of the application shard space 130, such as the number of application shards, the size of each application shard, etc.

The application shard management module 206 may also determine whether to add new application shards, such as to accommodate user growth. For example, if the number of users per application shard is to remain constant throughout multiple hash computations, one or more new application shards may be added to accommodate the user growth. In this way, increasing the size of the application shards to accommodate the user growth may be avoided. In an embodiment, the application shard management module 206 may determine whether to add new application shards when a new hash computation is performed.

The application shard management module 206 may generate the application shard space 130 to include the hashed user space 130*a* and the intermediate user space 130*b*. In an embodiment, the hashed user space 130*a* may be maintained for mappings of the existing users included in the hash computation. The intermediate user space 130*b* may be maintained for mappings of users that are not included in the hash computation. For example, the intermediate user space 130*b* may be maintained for mappings of the new users that are added to the social networking system after the hash computation, but before the next hash computation. In an embodiment, the intermediate user space 130*b* may also be maintained for mappings of the existing users that were not included in the hash computation because they had insufficient information to be effectively classified within a community.

The size of the intermediate user space 130*b* may vary in different embodiments. In certain embodiments, the intermediate user space 130*b* may be a percentage of the application shard space 130. In an embodiment, the intermediate user space 130*b* may be 25% or less of the application shard space 130. For example, the intermediate user space 130*b* may be 10% (or approximately 10%) of the application shard space 130. In this way, the application shards within the intermediate users space may be assigned to approximately 10% of the machines 102, and fanout may be limited by this 10% range. Other percentages may be used in other embodiments. In certain embodiments, the size of the intermediate user space 130*b* may be based on a growth rate of the social graph, such as a number of new users per week, month, etc.

The mapping module 208 may map users to application shards in the application shard space 130. The users included in the hash computation may be mapped to the application shards in the hashed user space 130*a*. The users not included in the hash computation may be mapped to application shards in the intermediate user space 130*b*.

The routing module 210 may route users to the machines 102 based on the mappings from the mapping module 208. A user included in the hash computation may be mapped to an application shard in the hashed user space 130*a*, and thus routed to the machine assigned to that application shard. When the user performs a query for information (e.g., information pertaining to the user's friends), the routing module 210 may route the query to that machine and the query may be performed by that machine. The information obtained from the query may then be saved in the cache memory layer for that machine. Because other users in the same community as the user may be mapped to the same machine, the information will be available in the cache memory layer for subsequent queries by the other users.

A user not included in the hash computation may be mapped to an application shard in the intermediate user space 130*b*, and thus routed to the machine assigned to that application shard. The users not included in the hash computation may be confined to the portion of the machines 102 assigned to the intermediate user space 130*b*. For example, if the intermediate user space 130*b* is sized for 10% user growth, then the new users may be confined to 10% of the machines 102. Thus, the increase in fanout from the new users may be limited by this 10% range.

Figure 3:
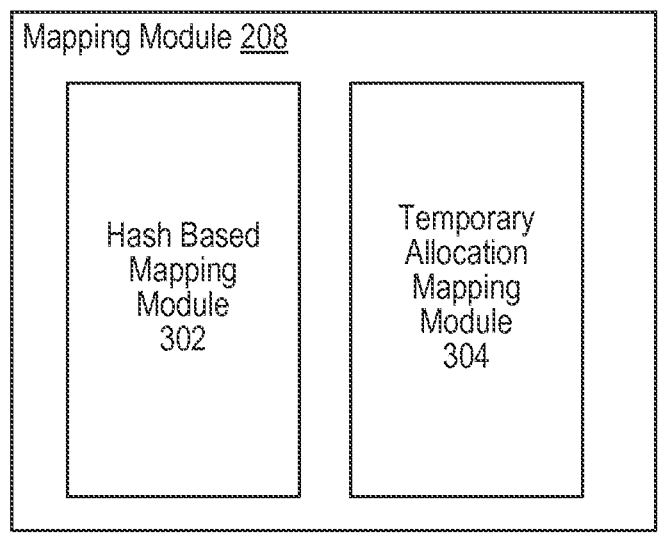
FIG. 3 illustrates an example mapping module, according to an embodiment.

FIG. 3 illustrates an example mapping module 208, according to an embodiment. The mapping module 208 includes a hash based mapping module 302 and a temporary allocation mapping module 304. It should be appreciated that the discussion above for FIGS. 1-2 may also apply to FIG. 3. For the sake of brevity and clarity, every feature and function applicable to FIG. 3 is not repeated here.

The hash based mapping module 302 may map the users included in the hash computation to the application shards in the hashed user space 130*a*, which may be assigned to specific machines of the machines 102. In this way, users included in the hash computation may be mapped to these specific machines. In an embodiment, the users may be mapped to the specific machines of the machines 102 such that users within the same community are mapped to the same machine.

The temporary allocation mapping module 304 may map the users not included in the hash computation to application shards in the intermediate user space 130*b*, which may be assigned to specific machines of the machines 102. In this way, users not included in the hash computation may be mapped to these specific machines of the machines 102.

The users not included in the hash computation may include users (e.g., new or existing users) having insufficient information to be effectively classified within a community. These users may be temporarily allocated to the machines assigned to the intermediate user space 130*b* until the next hash computation, when sufficient information to effectively classify these users may have been obtained.

Figure 4:
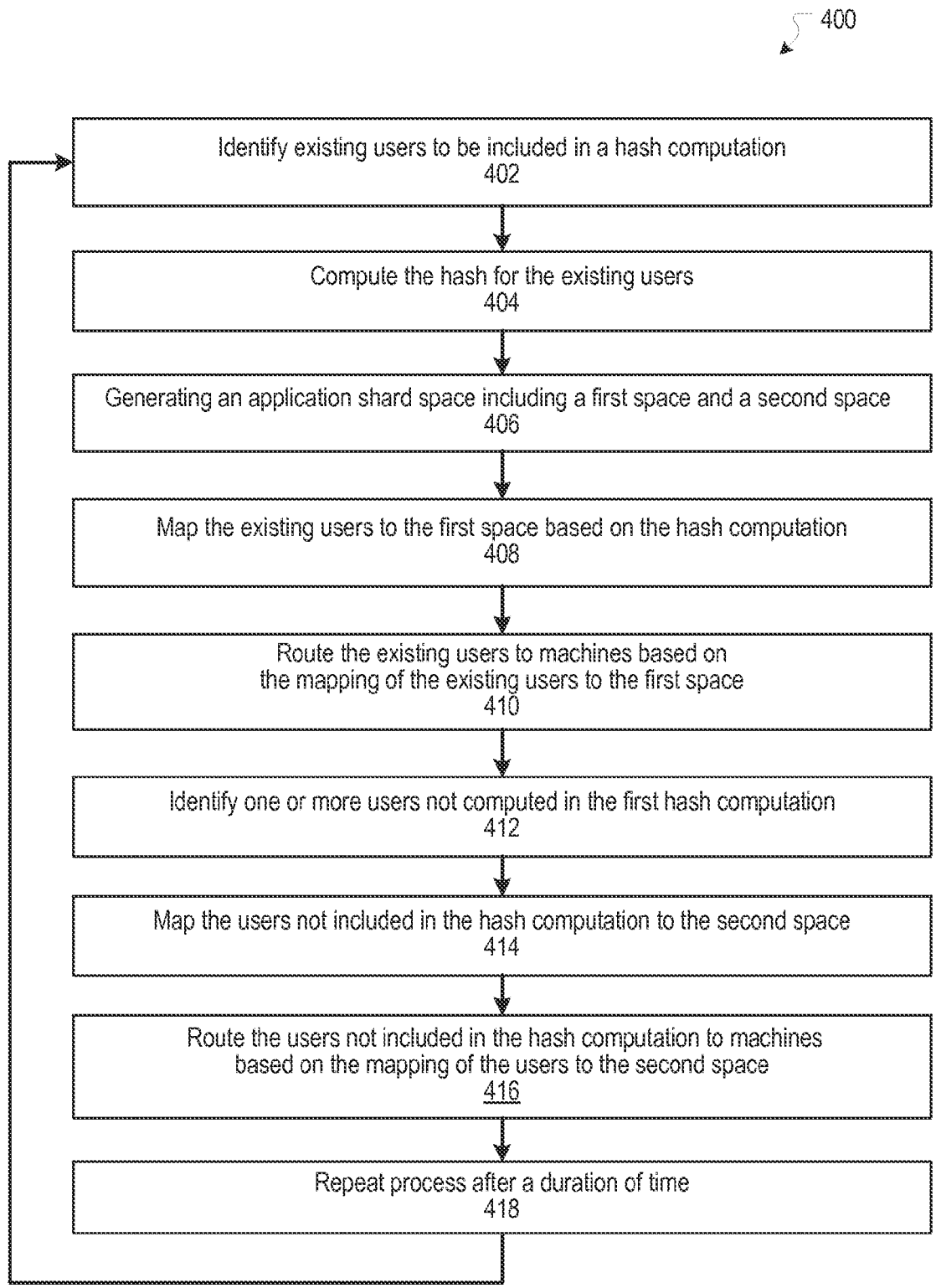
FIG. 4 illustrates an example method for adding new users to a social networking system, according to an embodiment

FIG. 4 illustrates an example method for adding new users to a social networking system, according to an embodiment. It should be appreciated that the discussion above for FIGS. 1-3 may also apply to FIG. 4. For the sake of brevity and clarity, every feature and function applicable to FIG. 4 is not repeated here.

At block 402 of method 400, existing users to be included in a hash computation may be identified. In an embodiment, all of the existing users of a social networking system may be included in the hash computation. In an embodiment, the existing users for the hash computation may exclude the existing users that have insufficient information to be effectively classified within a community. In an embodiment, block 402 may be performed by the user identification module 202 of FIG. 2.

At block 404, a hash may be computed for the existing users identified at block 402. The hash may be computed to generate an intelligent way of organizing the users, such as by clustering users of the same community together. In an embodiment, unique IDs may be sequentially assigned to existing users such that users within the same community have unique IDs that are numerically proximate to one another. In an embodiment, block 404 may be performed by the hash computation module 204 of FIG. 2.

At block 406, the application shard space including a hashed user space and an intermediate user space may be generated. The hashed user space may include application shards assigned to a portion of the machines of the social networking system. The intermediate users space may include application shards assigned to another portion of the social networking system. In an embodiment, the size of the intermediate user space may be based on a percentage of the size of the application shard space. In an embodiment, block 406 may be performed by the application shard management module 206 of FIG. 2.

At block 408, the existing users identified at block 402 may be mapped to the application shards in the hashed user space based on the hash computation. Since the application shards in the hashed user space may be assigned to specific machines, the existing users used in the hash computation may be mapped to these machines based on the hash computation. In an embodiment, the existing users included in the hash computation may be mapped to machines such that users within the same community are mapped to the same machine. In an embodiment, block 408 may be performed by the mapping module 208 of FIG. 2 and the hash based mapping module 302 of FIG. 3.

At block 410, the existing users included in the hash computation are routed to machines based on the mapping of the existing users to the hashed user space. In an embodiment, queries for information from existing users included in the hash computation may be routed to machines based on the mapping of the existing users to the hashed user space. In an embodiment, block 410 may be performed by the routing module 208 of FIG. 2.

At block 412, one or more users not included in the hash computation may be identified. For example, these users may include new users that are added to the social networking system after the hash computation. In an embodiment, these users may also include existing users that were not included in the hash computation. In an embodiment, block 412 may be performed by the user identification module 208 of FIG. 2.

At block 414, the users identified at block 412 may be mapped to application shards in the intermediate user space, and consequently mapped to the machines assigned to these application shards. For example, the new users that are added to the social networking system after the hash computation may be mapped to application shards in the intermediate user space, and consequently mapped to the machines assigned to the application shards. In an embodiment, existing users not included in the hash computation may be mapped to application shards in the intermediate user space, and consequently mapped to the machines assigned to the application shards. In an embodiment, block 414 may be performed by the mapping module 208 of FIG. 2 and the temporary allocation mapping module 304 of FIG. 3.

At block 416, the users not included in the hash computation are routed to machines based on the mapping of the users to the intermediate user space. In an embodiment, queries for information from users not included in the hash computation may be routed to machines based on the mapping of the users to the intermediate user space. In an embodiment, block 416 may be performed by the routing module 208 of FIG. 2.

At block 418, the process may be subsequently repeated after a period of time. The process may be repeated for the users of the social networking system that exist at the time of the next hash computation in the repeated process. This may include the existing users previously identified at block 402, as well as the users previously identified at block 414. For example, the new users that are added to the social networking system after the hash previously computed at block 404 may be considered part of the social networking system at the time of the hash computation for the repeated process. In an embodiment, one or more new application shards may be added to the application shard space to accommodate the second set of users.

The period of time at which the process is repeated may vary in different embodiments. The period of time may be selected to permit a sufficient amount of new users to be added to the social networked system before another hash computation is performed. Moreover, for users having insufficient information to be classified in a community at the time of the hash computation at block 404, the period of time may permit more information to be obtained for classifying the users within a community. In certain embodiment, the process may be repeated after a predetermined time period, such as 1 month, 3 months, 6 months, or any other time period. In certain embodiments, the process may be repeated after one or more conditions have occurred, such as a threshold amount of new users have been added to the social networking system. In certain embodiments, the process may be repeated at random, or selectively repeated at the discretion of a network administrator having control over the process.

Once a new hash computation is computed, applications may either implement the new hash computation and mappings, or remain using the previous hash computation and mappings. Some applications may store data in a persistent memory layer based on the hash computations, in which case it may be costly to move the data around on a frequent basis. Therefore, these applications may not implement one or more new hash computations to avoid costly moves when not needed.

Social Networking System—Example Implementation

Figure 5:
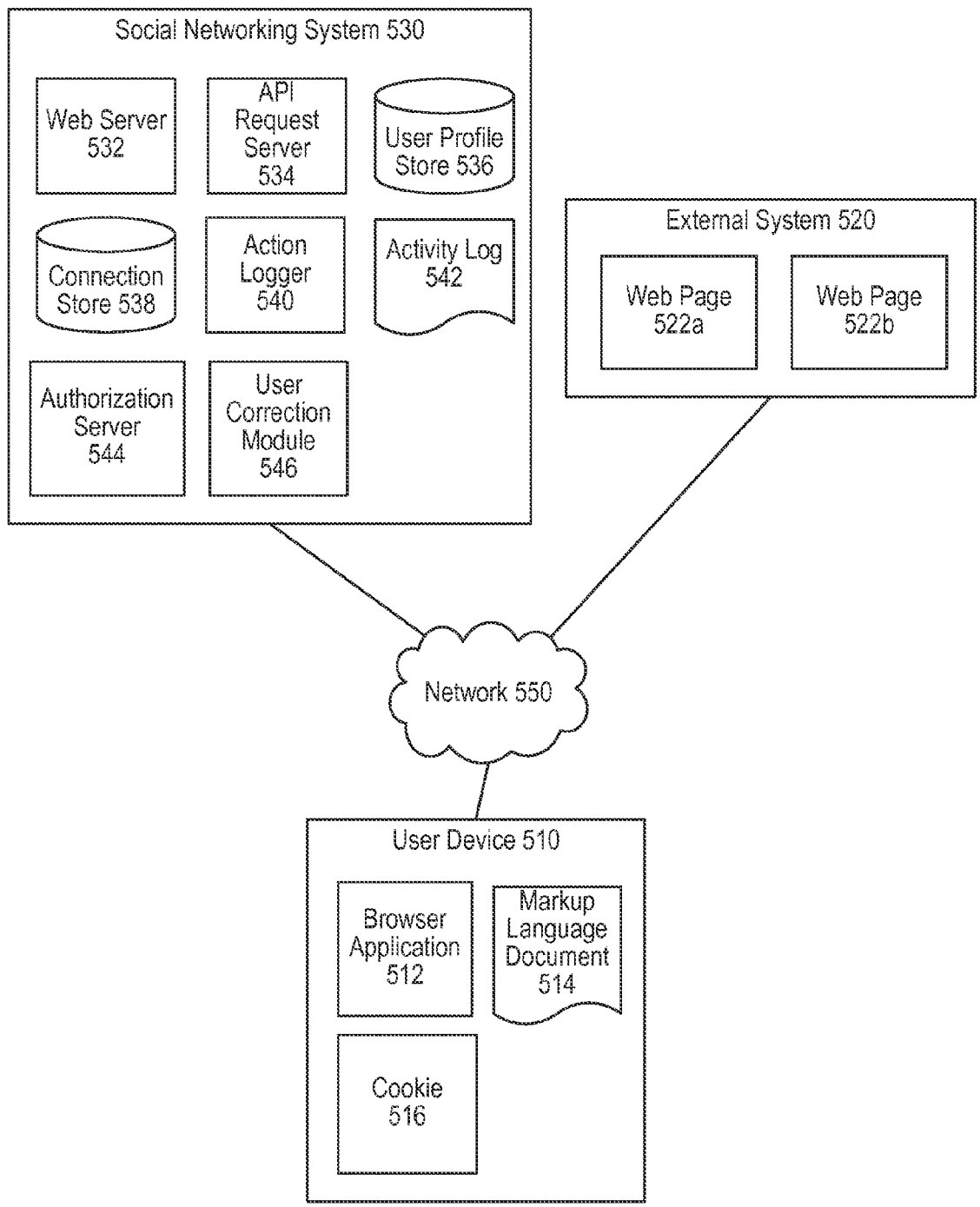
FIG. 5 illustrates an example network diagram of a system for adding new users to a social networking system, according to an embodiment.

FIG. 5 is a network diagram of an example system 500 for adding new users to a social network in accordance with an embodiment of the invention. The system 500 includes one or more user devices 510, one or more external systems 520, a social networking system 530, and a network 550. In an embodiment, the social networking system discussed in connection with the embodiments described above may be implemented as the social networking system 530. For purposes of illustration, the embodiment of the system 500, shown by FIG. 5, includes a single external system 520 and a single user device 55. However, in other embodiments, the system 500 may include more user devices 510 and/or more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices that can receive input from a user and transmit and receive data via the network 550. In one embodiment, the user device 510 is a conventional computer system executing, for example, a Microsoft Windows compatible operating system (OS), Apple OS X, and/or a Linux distribution. In another embodiment, the user device 510 can be a device having computer functionality, such as a smart-phone, a tablet, a personal digital assistant (PDA), a mobile telephone, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and/or wide area networks, using wired and/or wireless communication systems.

In one embodiment, the network 550 uses standard communications technologies and protocols. Thus, the network 550 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the SilverLight™ application framework, etc.

In one embodiment, the user device 510 also includes one or more cookies 516 including data indicating whether a user of the user device 510 is logged into the social networking system 530, which may enable modification of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content.

The social networking system 530 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 530 may be administered, managed, or controlled by an operator. The operator of the social networking system 530 may be a human being, an automated application, or a series of applications for managing content, regulating policies, and collecting usage metrics within the social networking system 530. Any type of operator may be used.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects a particular other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. The social networking system 530 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 530. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 530 modifies edges connecting the various nodes to reflect the relationships and interactions.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music or other similar data and/or media. Content may also be added to the social networking system 530 by a third party. Content "items" are represented as objects in the social networking system 530. In this way, users of the social networking system 530 are encouraged to communicate with each other by posting text and content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, an authorization server 544, and a video substitution module 546. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list". External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

The social networking system 530 may include a node correction module 546. The node correction module 546 may add new users to the social networking system 530. The clustering module 546 may compute a hash for existing users of the social networking system 530. The clustering module 546 may generate an application shard space including a hashed node space and an intermediate node space.

Existing users included in a hash computation may be mapped to the hashed node space, and consequently mapped to the machines assigned to the hashed node space. The users not included in the hash computation may be mapped to the intermediate node space, and consequently mapped to the machines assigned to the intermediate node space. The users, whether included in the hash computation or not, may be routed to the appropriate machines based on the mappings. The process may be repeated after a period of time for all of the existing users of the social networking system at the time of the next hash computation in the repeated process. In an embodiment, the node correction module 546 may be implemented as the node correction module 200 of FIG. 2.

Hardware Implementation

Figure 6:
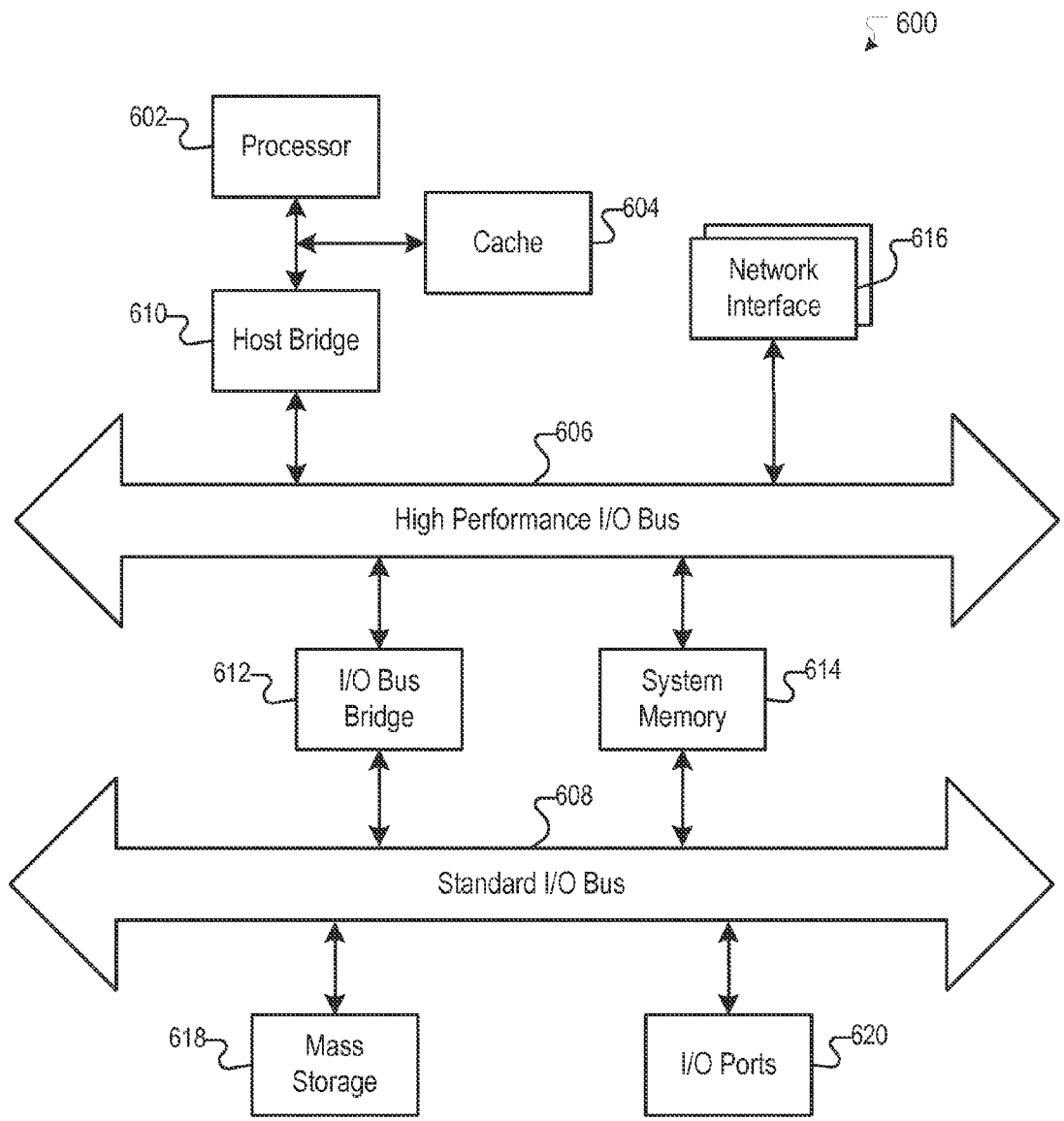
FIG. 6 illustrates an example computer system that may be used to implement one or more of the embodiments described herein, according to an embodiment.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be a component of the social networking system described herein. In an embodiment of the invention, the computer system 600 may be one server among many that constitutes all or part of the social networking system 730.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
identifying, by a computer, a first set of nodes in a networked computer system, the first set of nodes included in a first hash computation that clusters the first set of nodes into communities, wherein
each node of the first set of nodes is associated with a user on a social networking system, and the first hash computation clusters the first set of nodes into communities based on connections between the users on the social networking system;
generating, by the computer, an application shard space including a first space and a second space;
mapping, by the computer, the first set of nodes to application shards in the first space based on the first hash computation, the application shards in the first space assigned to a first set of machines of the networked computer system; and
maintaining, by the computer, the second space for mappings of nodes not included in the first hash computation to application shards in the second space, wherein the second space is reserved for nodes that have not been included in any hash computation.

2. The computer implemented method of claim 1, further comprising:
routing a node of the first set of nodes to a machine assigned to an application shard in the first space, wherein nodes include users.

3. The computer implemented method of claim 1, wherein the nodes not included in the first hash computation include new nodes added to the networked computer system after the first hash computation.

4. The computer implemented method of claim 1, wherein the nodes not included in the first hash computation include existing nodes having insufficient information to be classified within a community at the time of the first hash computation.

5. The computer implemented method of claim 1, further comprising:
identifying a node not included in the first hash computation; and
mapping the node not included in the first hash computation to an application shard in the second space.

6. The computer implemented method of claim 5, further comprising:
routing the node not included in the first hash computation to a machine assigned to an application shard in the second space.

7. The computer implemented method of claim 1, further comprising:
performing the first hash computation on the first set of nodes.

8. The computer implemented method of claim 1, further comprising:
identifying a second set of nodes in the networked computer system, the second set of nodes including the first set of nodes and one or more nodes not included in the first hash computation;
performing a second hash computation on the second set of nodes, the second hash computation clustering the second set of nodes into communities;
mapping the second set of nodes to the application shards in the first space based on the second hash computation; and
maintaining the second space for mappings of nodes not included in the second hash computation to application shards in the second space.

9. The computer implemented method of claim 8, further comprising:
routing a node of the second set of nodes to a machine assigned to an application shard in the first space.

10. The computer implemented method of claim 8, wherein the nodes not included in the second hash computation include new nodes added to the networked computer system after the second hash computation.

11. The computer implemented method of claim 8, wherein the nodes not included in the second hash computation include existing nodes having insufficient information to be classified within a community at the time of the second hash computation.

12. The computer implemented method of claim 8, further comprising:
identifying a node not included in the second hash computation; and
mapping the node not included in the second hash computation to an application shard in the second space.

13. The computer implemented method of claim 12, further comprising:
routing the node not included in the second hash computation to a machine assigned to an application shard in the second space.

14. The computer implemented method of claim 8, further comprising:
adding one or more new application shards to the application shard space to accommodate the second set of users.

15. The computer implemented method of claim 8, wherein the second hash computation is performed after a predetermined time period.

16. The computer implemented method of claim 1, wherein the application shards in the first space and the application shards in the second space remain a constant size.

17. The computer implemented method of claim 1, wherein the size of the intermediate node space is 25% or less than the size of the application shard space.

18. The computer implemented method of claim 1, the second space is reserved for users that have not yet joined the social networking system or users of the social networking system for which there is insufficient information to be classified into a community at the time of the hash computation.

19. A system comprising:
at least one processor, and
a memory storing instructions configured to instruct the at least one processor to perform:
identifying a first set of nodes in a networked computer system, the first set of nodes included in a first hash computation that clusters the first set of nodes into communities, wherein
each node of the first set of nodes is associated with a user on a social networking system, and
the first hash computation clusters the first set of nodes into communities based on connections between the users on the social networking system;
generating an application shard space including a first space and a second space;
mapping the first set of nodes to application shards in the first space based on the first hash computation, the application shards in the first space assigned to a first set of machines of the networked computer system; and
maintaining the second space for mappings of nodes not included in the first hash computation to application shards in the second space, wherein
nodes mapped to the second space have not been included in any hash computation.

20. A non-transient computer storage medium storing computer-executable instructions that, when executed, cause a computer system to perform computer-implemented method comprising:

identifying a first set of nodes in a networked computer system, the first set of nodes included in a first hash computation that clusters the first set of nodes into communities, wherein
   each node of the first set of nodes is associated with a user on a social networking system, and
   the first hash computation clusters the first set of nodes into communities based on connections between the users on the social networking system;

generating an application shard space including a first space and a second space;

mapping the first set of nodes to application shards in the first space based on the first hash computation, the application shards in the first space assigned to a first set of machines of the networked computer system; and maintaining the second space for mappings of nodes not included in the first hash computation to application shards in the second space, wherein
   nodes mapped to the second space have not been included in any hash computation.

\* \* \* \* \*